United States Patent [19]
Bernard

[11] 3,835,728
[45] Sept. 17, 1974

[54] BALANCING DEVICE FOR A SIX CRANKPIN CRANKSHAFT

[75] Inventor: Michel Bernard, Lyon, France

[73] Assignee: Automobiles M. Berliet, Lyon (Rhone), France

[22] Filed: July 6, 1973

[21] Appl. No.: 377,009

[30] Foreign Application Priority Data
July 7, 1972 France .................................. 72.25654

[52] U.S. Cl. .................................................. 74/603
[51] Int. Cl. ............................................... F16c 3/00
[58] Field of Search .................... 74/603; 123/192 B

[56] References Cited
UNITED STATES PATENTS
| | | | |
|---|---|---|---|
| 1,165,861 | 12/1915 | Fekete | 74/603 |
| 1,351,417 | 8/1920 | Dodge | 74/603 |
| 1,355,439 | 10/1920 | Weinhardt | 74/603 |
| 2,680,387 | 6/1954 | White et al. | 74/603 |

*Primary Examiner*—Samuel Scott
*Assistant Examiner*—F. D. Shoemaker
*Attorney, Agent, or Firm*—Sughrue, Rothwell, Mion, Zinn & Macpeak

[57] ABSTRACT

The arrangement of the weights for balancing a crankshaft having six crankpins is such that the middle balance weights are offset by an angle of 60 degrees with respect to the end crankpins and are diametrically opposed to the middle crankpins. The middle balance weights are diametrically opposed to the end balance weights and are identical thereto. All of the balance weights have the same symmetric longitudinal axis.

3 Claims, 4 Drawing Figures

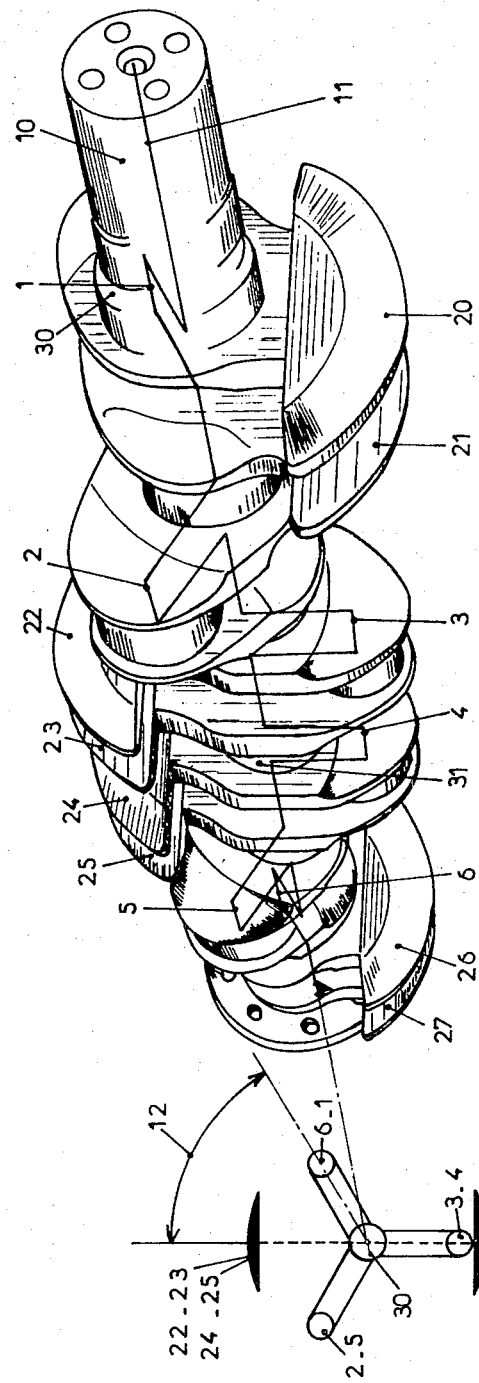

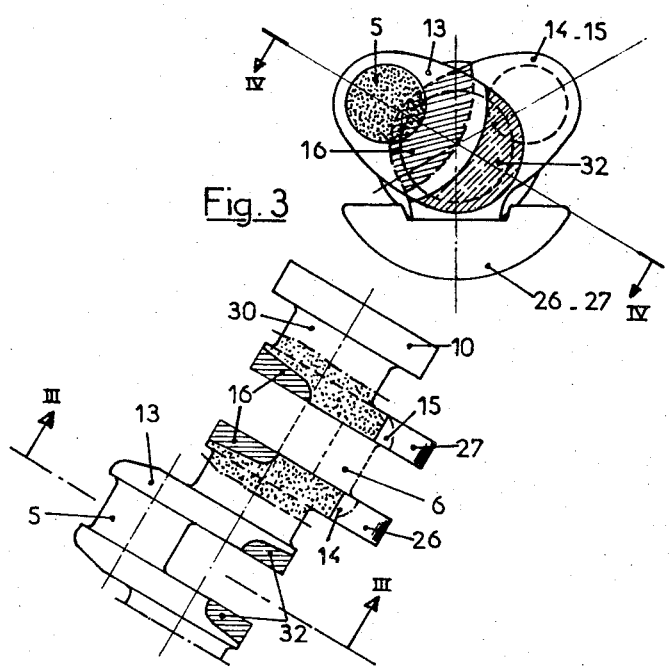

BALANCING DEVICE FOR A SIX CRANKPIN CRANKSHAFT

The invention relates to the arrangement of the balance weights for balancing a crankshaft.

The two, or four, middle balance weights are offset by an angle of about 60° with respect to the end crankpins 1 and 6. They are thus diametrally opposed to the middle crankpins 3 and 4. The arms of the crankpins 1, 2, 5, 6 may be reduced without the balance of whole assembly being endangered. Application: crankshaft and balance weight assembly having a minimum weight.

The present invention relates to fitting eight, or on occasion four balance weights onto a six crankpin crankshaft. It relates more particularly to a crankshaft of a six cylinder Diesel engine.

Balance arrangements are known, which enable the deformation of the crankshaft and the stresses on the central bearing to be balanced. A solution of the problem consists in using twelve balance weights disposed each opposite one crank. However, generally only eight, or even four, balance weights are used. This latter solution is more economical, and makes it easier to machine the supports and drill the holes intended for fixing the balance weights on the supports, since the holes lie all in the same plane. On the other hand, said solution provides an adequate compensation for the stresses exerted on the central bearing which bears the heaviest load. In such an arrangement, the central balance weights are offset by an angle of about 22° with respect to the end crankpins. The offsetting is carried out in the direction of the axis of the intermediate crankpins.

This conventional arrangement is the result of a theoretical calculation of the deformation undergone by the central journal of the crankshaft, while assuming that said journal does not rest on any support. Actually such supports do exist since the crankshaft rests over all its bearings, and the forces exerted on the central crankpins are not fully compensated for during the work.

The object of the present invention is to obviate such drawbacks, and to provide a balance weight arrangement which is more efficient during the use of the crankshaft.

A device according to the invention comprises a six crankpin crankshaft provided with a balancing system including at least four balance weights, and it is characterized in that the offset angle of the central balance weights is 60° with respect to the longitudinal axial plane of the end crankpins, so that said balance weights are diametrically opposed to the central crankpins. According to another feature of the invention, the balance weights corresponding to the end crankpins are opposed to those for the central crankpins, and have the same longitudinal axis of symmetry.

According to another feature of the invention, the balancing system thus disposed comprises four central balance weights, and two balance weights at each end of the crankshaft, while all said balance weights are fixed on bearings formed on the arms connecting the journals to the crankpins of the crankshaft. Of course, the balance weights may be either forged or cast together with the crankshaft assembly, or inserted by fixing them on bearings provided on the arms.

According to another feature of the invention, the balancing system is constituted by two balance weights adjacent to the central bearing, and a balance weight at each end of the crankshaft.

According to a further feature of the invention, all the balance weights and the bearings therefor are identical, and their antagonistic positioning is such that lightening the insides of the arms of the end crankpins and the intermediate crankpins symmetrically does not unbalance the crankshaft.

The appended drawing, given by way of non-limiting example, will allow an understanding the features of the invention more clearly.

FIG. 1 is a perspective view of a crankshaft provided with eight balance weights.

FIG. 2 illustrates the projection of the crankshaft onto a radial plane.

FIG. 3 is a sectional view along line III—III of FIG. 4, level with an intermediate crankpin.

FIG. 4 is a partial sectional view along line IV—IV of FIG. 3.

FIG. 1 illustrates a perspective view of a six cranpin crankshaft 10, the spatial position of said crankpins being materialized by line 11. There are thus, starting from one end of the crankshaft, an end crankpin 1, then an intermediate crankpin 2, located at 120° with respect to 1, then two central crankpins 3 and 4, located at 120° with respect to 2, and an intermediate crankpin 5 in the same plane as 2, and, lastly, the end crankpin 6, in the same plane as 1. The four balance weights which are central, to wit, 22, 23, 24, 25 are substantially opposed to the central crankpins 3 and 4, and the longitudinal plane of symmetry thereof defines, together with the axial plane of the crankpins 2 and 6, an angle substantially equal to 60°, as shown by arrow 12 (FIG. 2). The projection onto a plane perpendicular to the axis of the crankshaft shows clearly the respective positions of the balance weights 20, 21, 22, 23, 24, 25, 26, 27 and crankpins 1, 2, 3, 4, 5, 6. The central journals of the crankshaft are illustrated by the circle 30. The arrangement corresponds to the ignition order 1, 5, 3, 6, 2, 4 in the cylinders of a Diesel engine.

The arms 14 and 15 of the crankpin 6 (FIGS. 3 and 4) are machined and drilled to receive the balance weights 26 and 27. The latter are located (FIG. 3) comparatively far from the axis of an arm, so that it is possible to reduce the arms 14 and 15 at 16 (FIG. 4). Of course, to keep the crankshaft balanced, any reduction of the insides of the arms 14 and 15 of the crankpin 6 involves reducing the arms of the crankpin 1 identically, as well as reducing in an identical way, but in the opposite direction, the insides of the arms of the crankpins 2 and 5 (at 32), this owing to the symmetrical arrangement of the balance weights with respect to said crankpins.

The operation is as follows:

During the rotation of the crankshaft 10, the journals such as 30 run in bearings. It is the central journal 31, and hence the corresponding bearing, which undergoes the most substantial stresses. Said journal 31 is the journal machined between the crankpins 3 and 4. The balancing system aims at compensating for the stresses, and hence the deformations, that the bearing corresponding to 31 would undergo. The value of the angle 12 results in a position diametrically opposed to the central crankpins 3 and 4 and the central balance weights 22, 23 24, 25. Thus, when substantial centrifugal efforts are applied to the crankpins 3 and 4, said efforts are considerably reduced on a level with the bearing which supports the central journal 31. The compensation is not so good as regards the other journals 30, but the latter undergo stresses definetely smaller than the central bearing.

An arrangement according to the invention has in particular the following advantages:

the crankshaft and, in particular, the central bearing, are subjected during the work to stresses definitely smaller than in the conventional arrangement, while the mass of the balance weights is the same;

with the same advantages, the arrangement described hereinabove can be applied to a balancing system with four balance weights;

the location of the end balance weights with respect to the arms carrying same makes it possible to reduce the insides of said arms, whether the balance weights are loose and bolted to the arms, or cast or forged in one piece with the crankshaft.

I claim:

1. A crankshaft balancing arrangement for a crankshaft having six crankpins comprising at least two middle balance weights and two end balance weights, said middle balance weights being attached to the crankshaft diametrically opposite the two middle crankpins so that said middle balance weights are offset 60° with respect to the longitudinal axial plane of the end crankpins and said end balance weights being secured to said crankshaft adjacent the end crankpins in a manner opposed to said middle balance weights so that said end balance weights and said middle balance weights have the same longitudinal symmetry plane.

2. A crankshaft balancing arrangement as set forth in claim 1 wherein said crankshaft is provided with two end journals and a central journal and further comprising two additional middle balance weights, all of said balance weights being of integral construction with the arms connecting said journals to the crankpins of said crankshaft.

3. A crankshaft balancing arrangement as set forth in claim 1 wherein the inner portions of the arms of the end crankpins and the intermediate crankpins have cavity means to provide a symmetrical weight reduction of the arms without unbalancing said crankshaft.

* * * * *